United States Patent
Chen

[19]

[11] Patent Number: 6,032,590
[45] Date of Patent: Mar. 7, 2000

[54] KNOCKDOWN TABLE/CHAIR ASSEMBLY

[76] Inventor: Yue-Sheu Chen, 1st. Floor, No. 355, Sec. 4, Taipei, Taiwan

[21] Appl. No.: 09/114,165

[22] Filed: Jul. 13, 1998

[30] Foreign Application Priority Data

Jan. 23, 1998 [TW] Taiwan ................................ 87201348

[51] Int. Cl.⁷ ...................................................... A47B 3/06
[52] U.S. Cl. ......................... 108/158.12; 108/64; 108/38; 403/381
[58] Field of Search ................. 108/158.12, 64, 108/65, 59, 38, 90; 403/381, 334, 331

[56] References Cited

U.S. PATENT DOCUMENTS

| | | | |
|---|---|---|---|
| 2,101,573 | 12/1937 | Cramer et al. | 108/64 |
| 2,489,933 | 11/1949 | Schwarz, Jr. | 108/64 |
| 2,694,609 | 11/1954 | Trafford | 108/64 |
| 2,942,921 | 6/1960 | Rachman et al. | 108/69 |
| 4,192,083 | 3/1980 | Rebbeck | 108/64 X |
| 4,217,832 | 8/1980 | Pozzman | 108/64 X |
| 4,243,279 | 1/1981 | Ackeret | 108/64 X |
| 4,867,598 | 9/1989 | Winter, IV | 403/381 |
| 4,887,536 | 12/1989 | Teichner | 108/38 X |
| 5,524,394 | 6/1996 | Szabo, Sr. et al. | 403/381 X |

FOREIGN PATENT DOCUMENTS

| | | | |
|---|---|---|---|
| 1352724 | 1/1964 | France | 108/38 |
| 1486443 | 5/1967 | France | 108/90 |
| 2551333 | 3/1985 | France | 108/38 |
| 2229107 | 12/1972 | Germany | 108/38 |
| 567869 | 10/1957 | Italy | 108/64 |
| 2253997 | 9/1992 | United Kingdom | 108/90 |

*Primary Examiner*—Peter M. Cuomo
*Assistant Examiner*—Hanh V. Tran
*Attorney, Agent, or Firm*—Rosenberg, Klein & Bilker

[57] ABSTRACT

A knockdown table/chair assembly including a table face and multiple telescopic table legs. The table face is composed of multiple table board members each having coupling sections on lateral edges for coupling with each other to assemble the table board members into the table face. A bottom side of the table face is disposed with multiple connecting sockets for inserting the table legs therein so as to support the table face. The length of the table legs can be respectively adjusted to adjust the height of the table face and keep the table face horizontal. The knockdown table/chair assembly further includes several folding chairs received in bottom side of the table board members and a suitcase for containing the above components for easy carriage. The suitcase can be stretched open and supported on several table legs to form another table.

6 Claims, 10 Drawing Sheets

KNOCKDOWN TABLE/CHAIR ASSEMBLY

BACKGROUND OF THE INVENTION

1. Field of the Invention

The present invention relates to a knockdown table/chair assembly which is easily portable for outdoor use.

2. Description of the Prior Art

In the existing portable knockdown table/chair assembly, the table face is composed of two table boards connected to the chairs by complicated linkage mechanism. It is difficult to fold or unfold the table face. Moreover, the table face has quite small area and is fixedly coupled with the chairs and the height of the table face cannot be adjusted to keep the table face horizontal when used outdoors. Also, it is inconvenient for a user to take a seat or leave the seat.

SUMMARY OF THE INVENTION

It is therefore a primary object of the present invention to provide a knockdown table/chair assembly which is easily portable for outdoor use. The table face is composed of multiple table board members assembled with each other to form a large area of table face.

Telescopic table legs are inserted in four corners of bottom side of the table face. The length of the table legs can be respectively adjusted so as to adjust the height of the table face and keep the table face horizontal. The above components are contained in a suitcase. The suitcase can be stretched open and supported on several table legs to form another table. The present invention can be best understood through the following description and accompanying drawings, wherein:

DETAILED DESCRIPTION OF THE PREFERRED EMBODIMENTS

Figure 1:
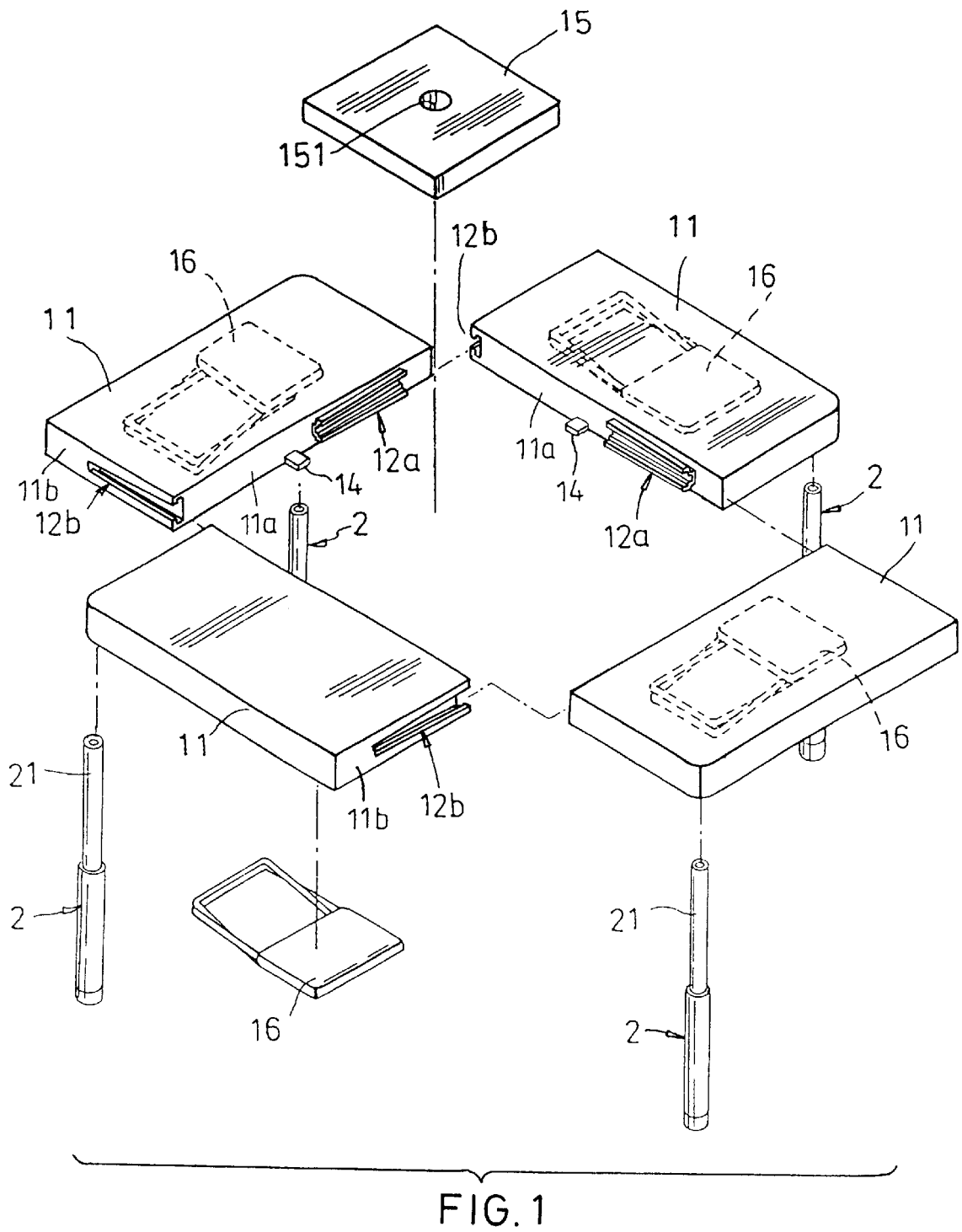
FIG. 1 is a perspective exploded view of the present invention.

Please refer to FIGS. 1 to 12. The knockdown table/chair assembly of the present invention includes a table face 1 composed of multiple table board members 11. Each table board member 11 has a first and a second lateral edges 11a, 11b adjacent to the other. The first and second lateral edges 11a, 11b are respectively disposed with a first coupling section 12a and a second coupling section 12b coupled with the first coupling section 12a. The first coupling section 12a of each table board member 11 is coupled with the second coupling section 12b of the other table board member 11 to assemble the table board members 11 into a complete table face 1. The table board members 11 can be alternatively assembled to form otherwisely shaped table face. The bottom side of the table face 1 is disposed with multiple connecting sockets 12c for inserting multiple table legs 2 therein so as to support the table face 1.

As shown in FIGS. 1, 2, 5 and 7, the first coupling section 12a has a first latch portion 121a and a second latch portion 121b. The first latch portion 121a is connected with the first lateral edge 11a of the table board member 11, while the second latch portion 121b is connected with the first latch portion 121a. The width of the first latch portion 121a is less than the width of the second latch portion 121b. The second coupling section 12b has a first latch channel 122a and a second latch channel 122b. The first latch channel 122a is connected with the second lateral edge 11b of the table board member 11, while the second latch channel 122b is adjacent to the first latch channel 122a. The width of the first latch channel 122a is less than the width of the second latch channel 122b. The first latch portion 121a is engaged in the first latch channel 122a, while the second latch portion 121b is engaged in the second latch channel 122b. Both of the second latch channel 122b and the second latch portion 121b are tapered, having a relatively narrow dead end, whereby the second latch portion 121b can be tightly fitted into the second latch channel 122b.

The table board members 11 define a central receptacle 13 for flushly fitting an insertion member 15 therein. The insertion member 15 is formed with a through hole 151 for passing a stem of an umbrella (not shown) therethrough and imbedding the stem into the ground. The insertion member 15 can be also formed with a through hole 152 for mounting thereon an article bag 153.

The edge of the table board member 11 is further disposed with a retaining section 14 for retaining the insertion member 15 or other appliances placed in the receptacle 13, such as an oven. The bottom face of the table board member 11 is formed with receiving recesses 123, 124 respectively for receiving a folding chair 16 and table leg 2.

The table leg 2 is formed by two or more segments of telescopic rod members 21 for adjusting the length of the table leg and the height of the table face in accordance with the topography of the ground. The table legs 2 are inserted into the sockets 12c of the bottom side of the table face 1 for supporting the table face 1.

Figure 8:
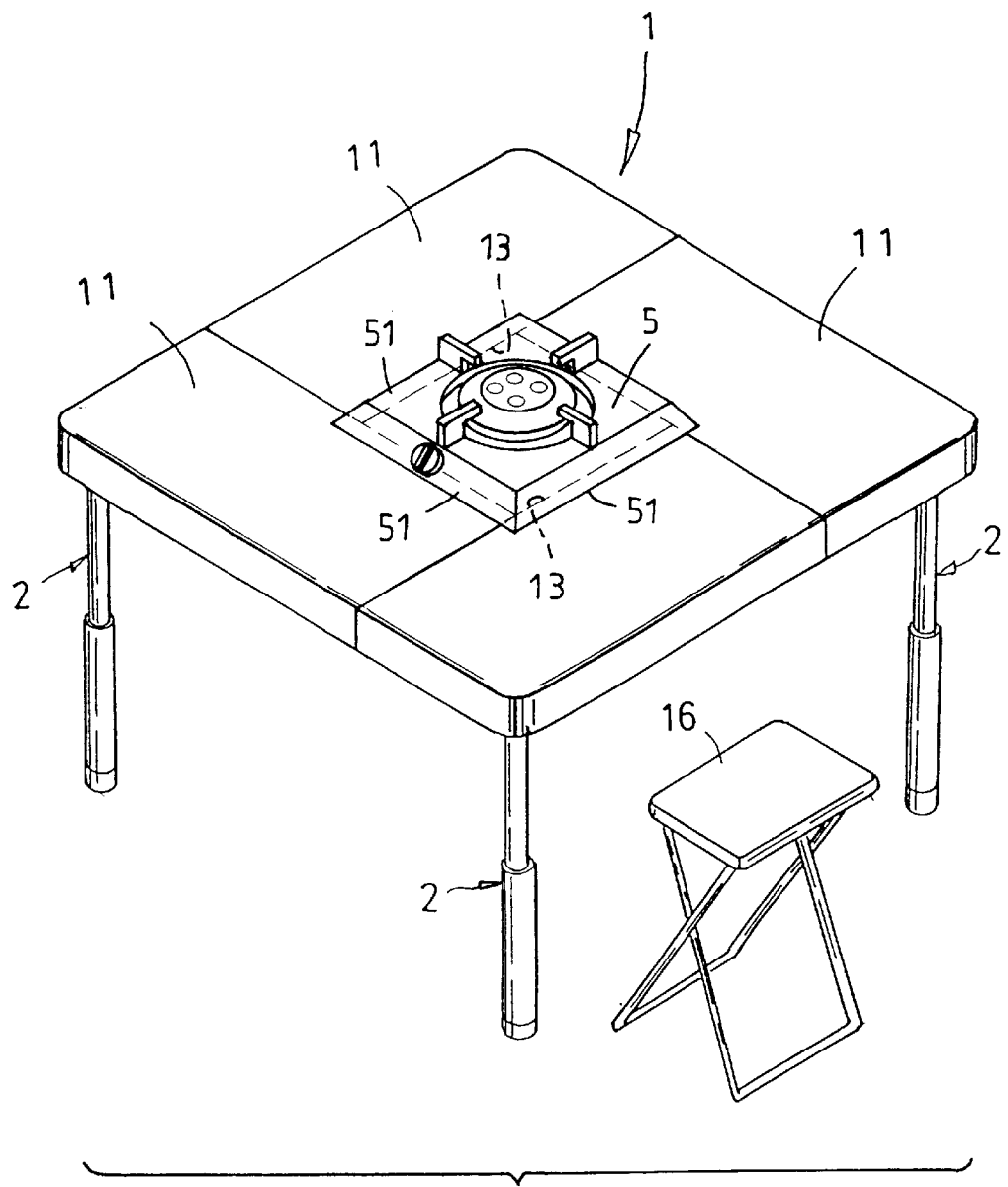
FIG. 8 is a perspective view showing that a gas oven is placed in the receptacle of the table face instead of the insertion member.

The insertion member 15 can be removed from the central receptacle 13 and instead, an oven 5 can be placed into the receptacle 13 with the edge 51 of the oven 5 bridged over the periphery of the receptacle 13 as shown in FIG. 8.

Figure 9:
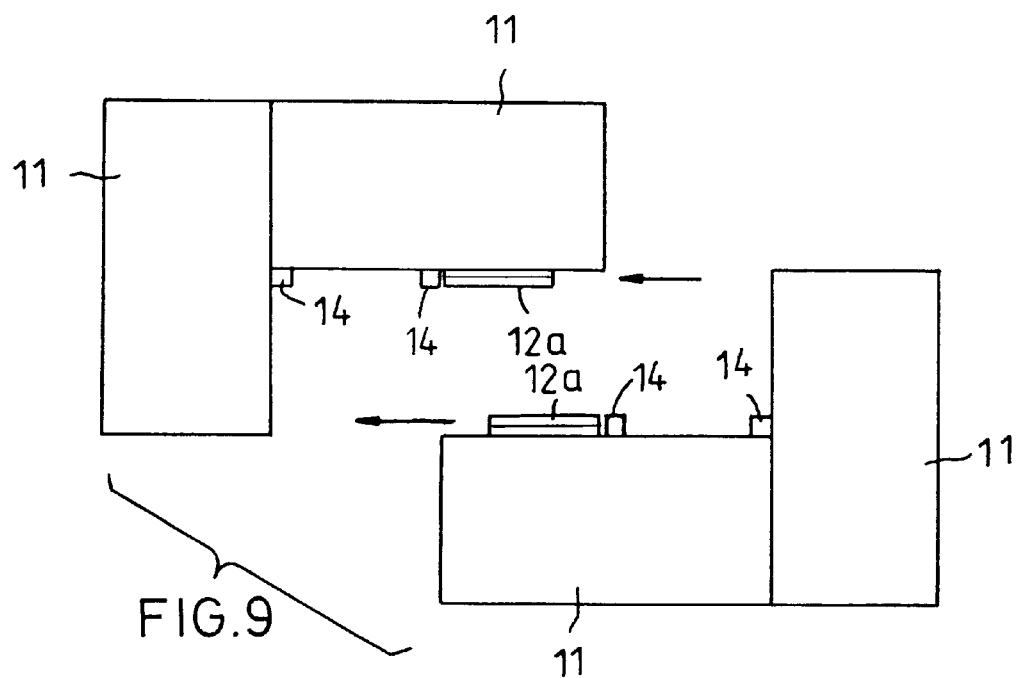
FIG. 9 is a plane view showing a first step of assembling procedure of the table face of the present invention.
Figure 10:
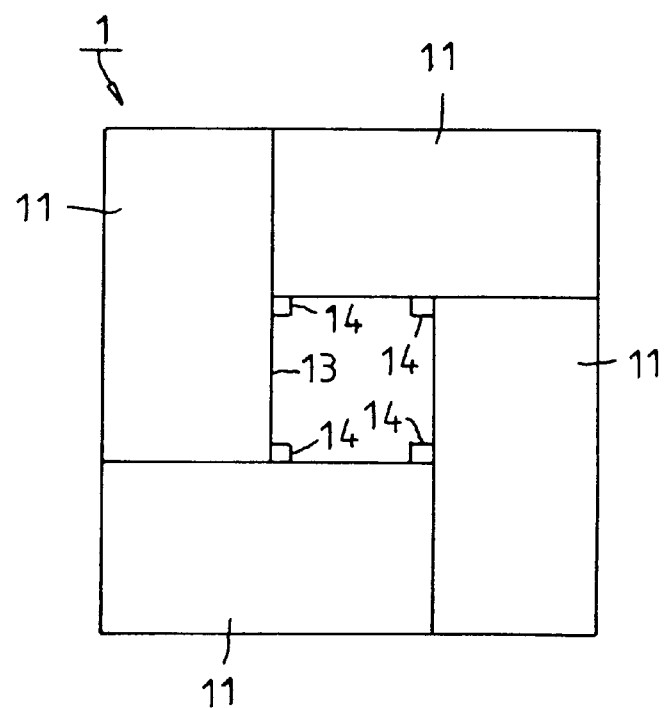
FIG. 10 is a plane view showing a second step of assembling procedure of the table face of the present invention.

Referring to FIGS. 9 and 10, when assembled, the four table board members 11 are first divided into two groups.

Figure 2:
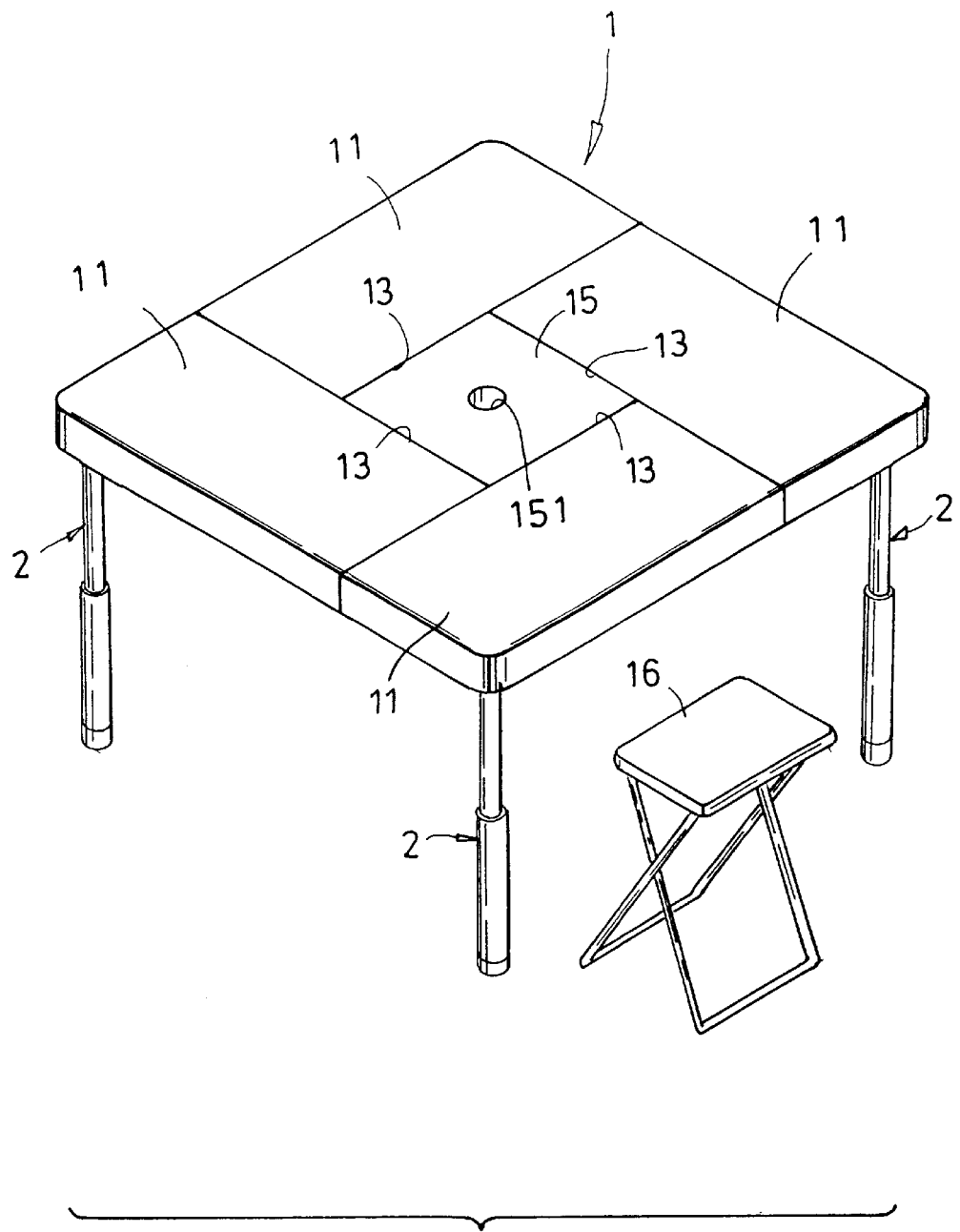
FIG. 2 is a perspective assembled view of the present invention.
Figure 3:
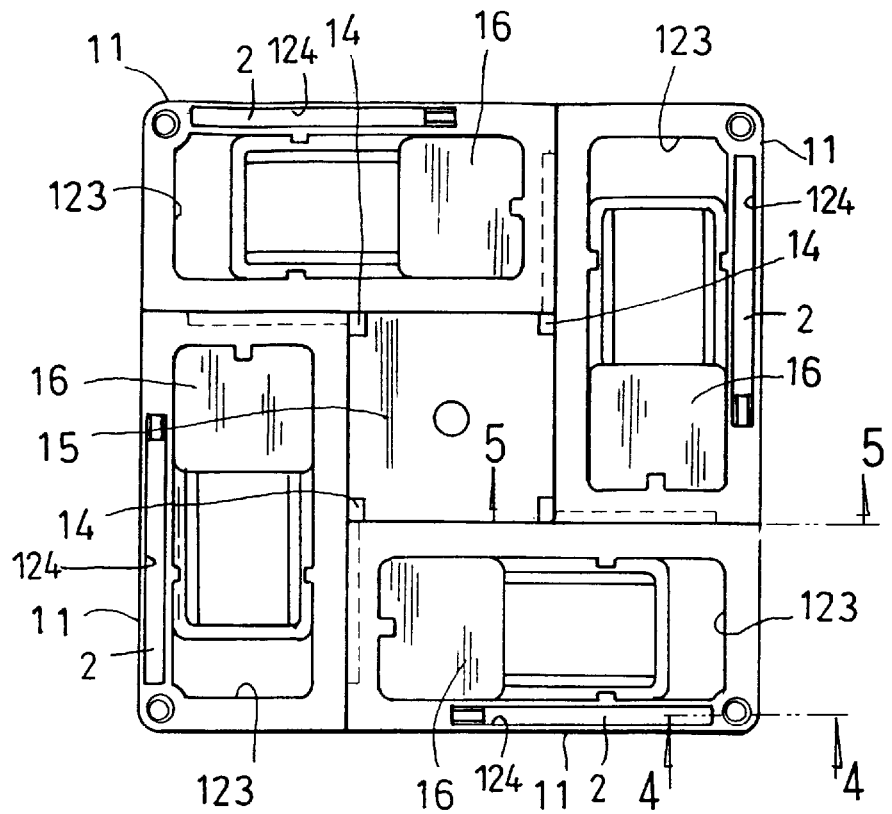
FIG. 3 is a bottom assembled view of the present invention.
Figure 4:
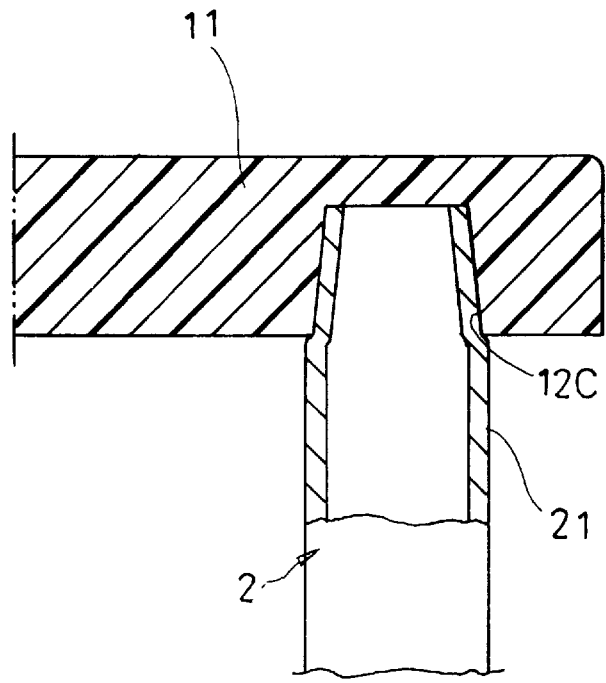
FIG. 4 is a sectional view taken along line 4—4 of FIG. 3.
Figure 5:
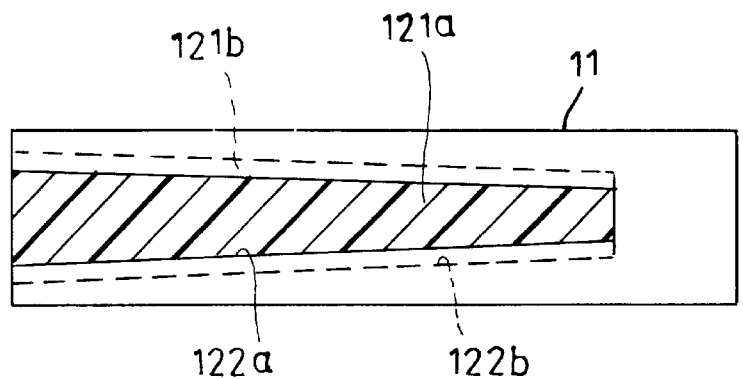
FIG. 5 is a sectional view taken along line 5—5 of FIG. 3.
Figure 6:
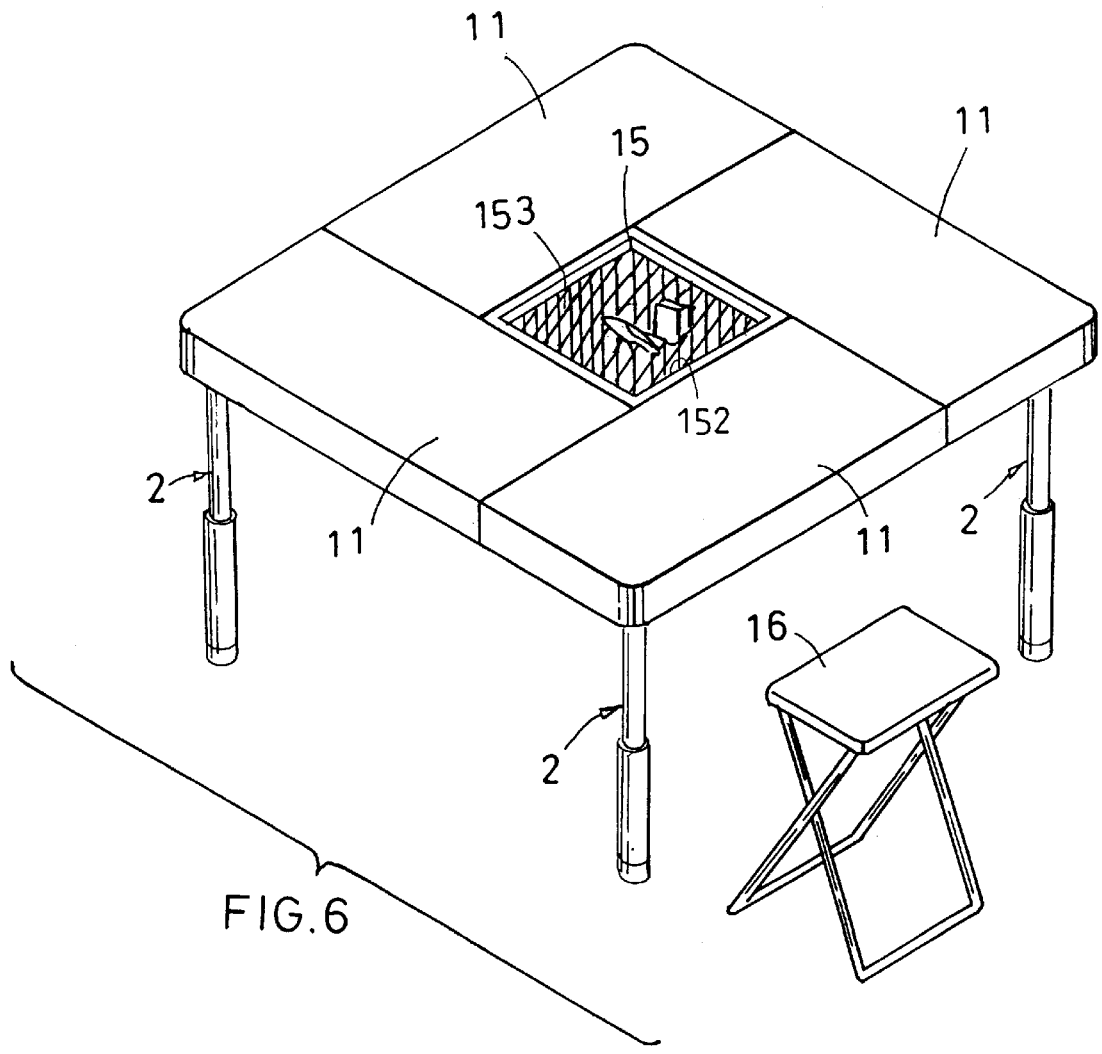
FIG. 6 is a perspective view of another embodiment of the insertion member of the present invention.
Figure 7:
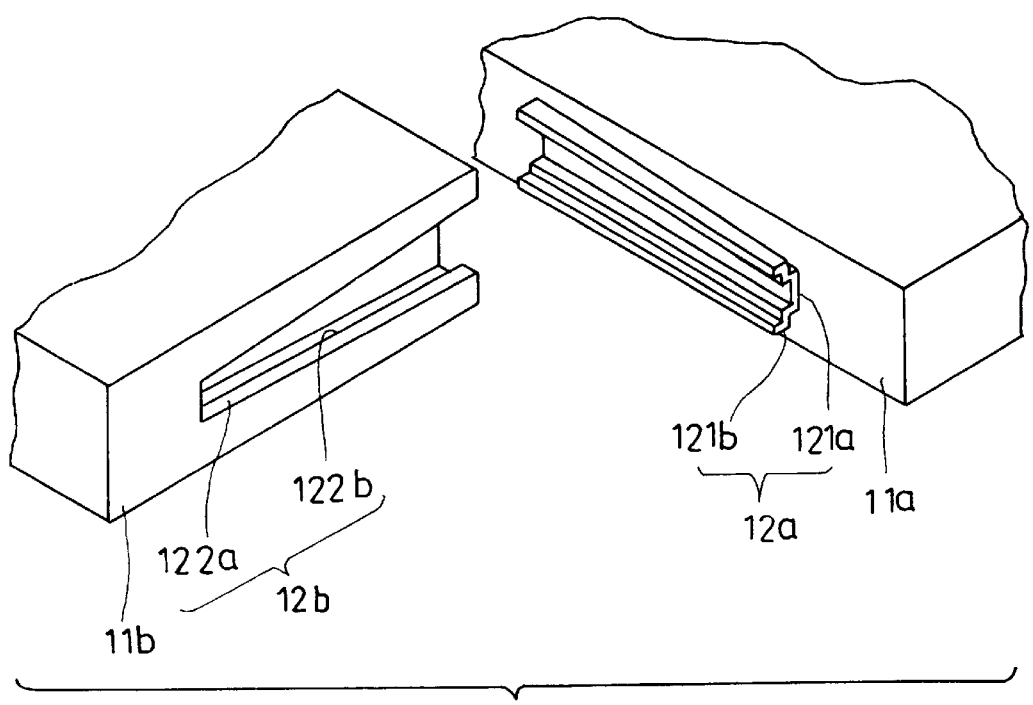
FIG. 7 is a partially enlarged view of the first and second coupling sections of the present invention.
Figure 11:
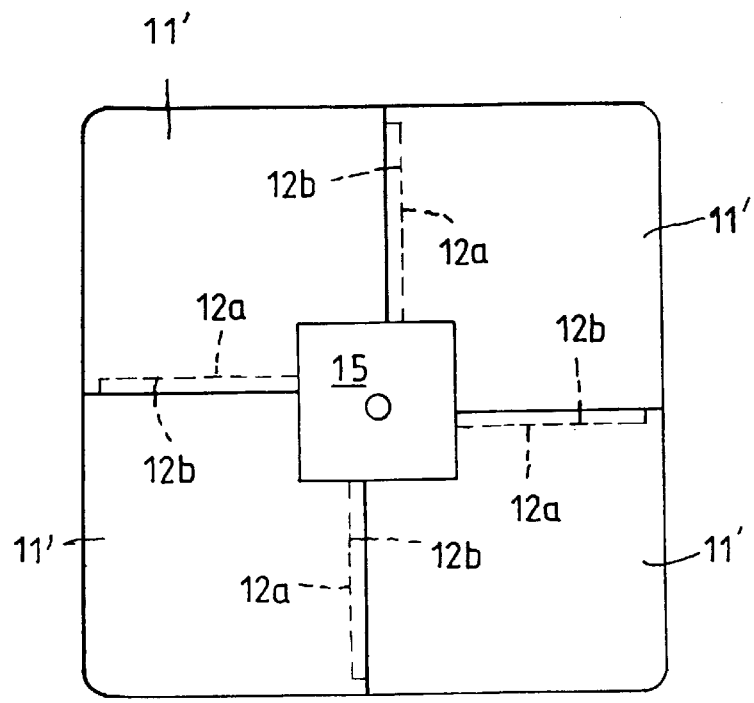
FIG. 11 is a top view of another embodiment of the present invention.
Figure 12:
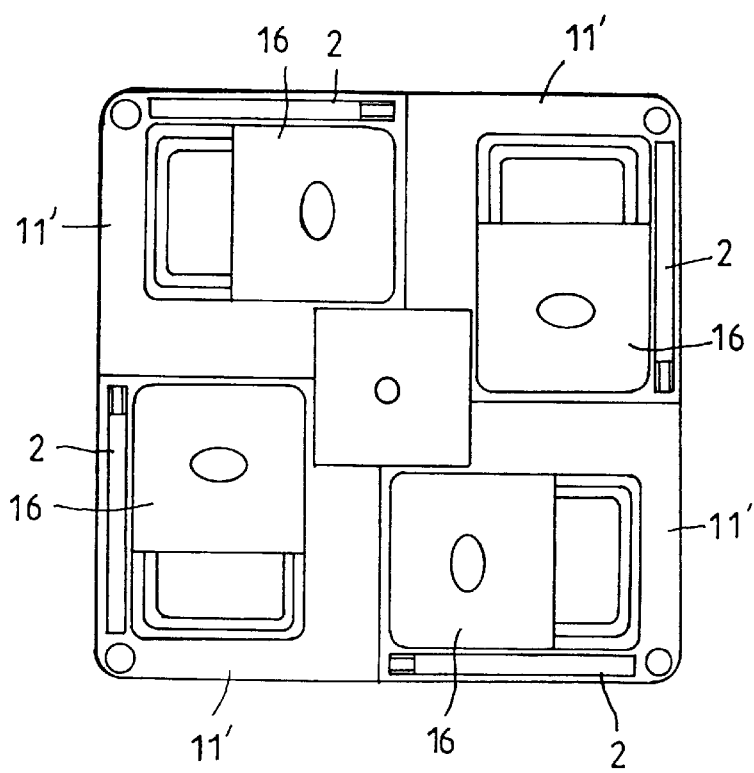
FIG. 12 is a bottom view of another embodiment of the present invention.

The two table board members 11 of each group is first assembled into an L-shaped preliminary unit. Then the two L-shaped preliminary units are assembled to form the table face as shown in FIG. 2. As shown in FIGS. 11 and 12, the table face can be alternatively formed by four L-shaped table board members 11'.

Figure 13:
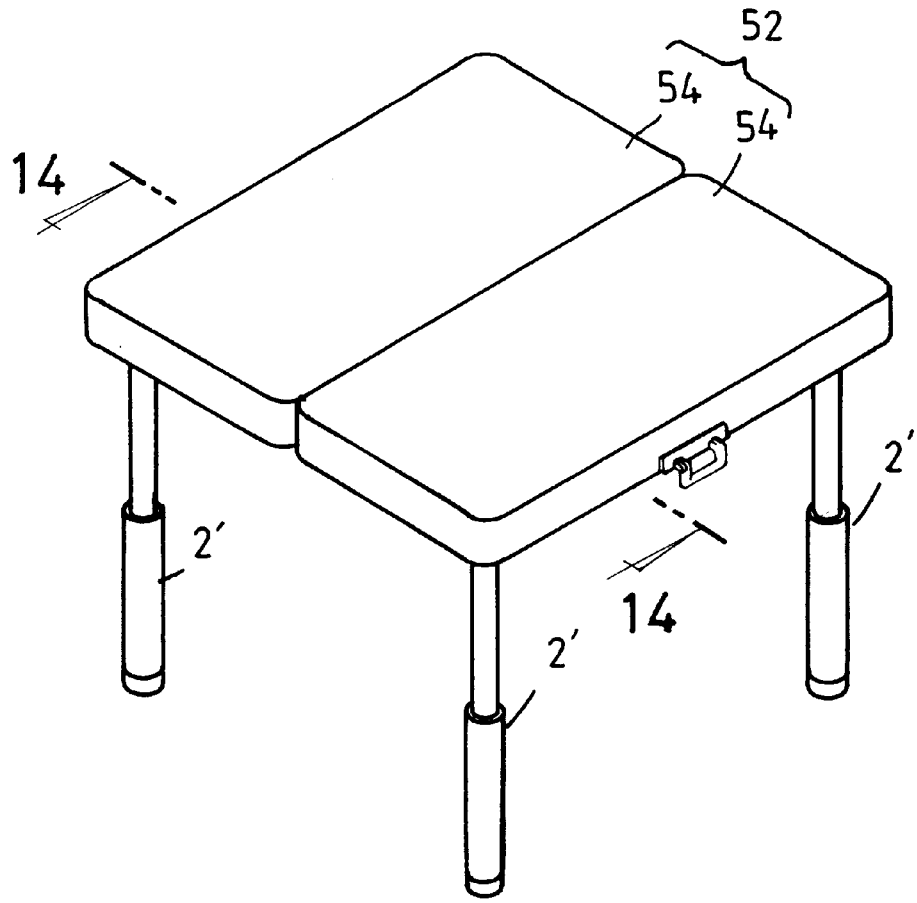
FIG. 13 is a perspective view showing that the suitcase is stretched open to form another table.
Figure 14:
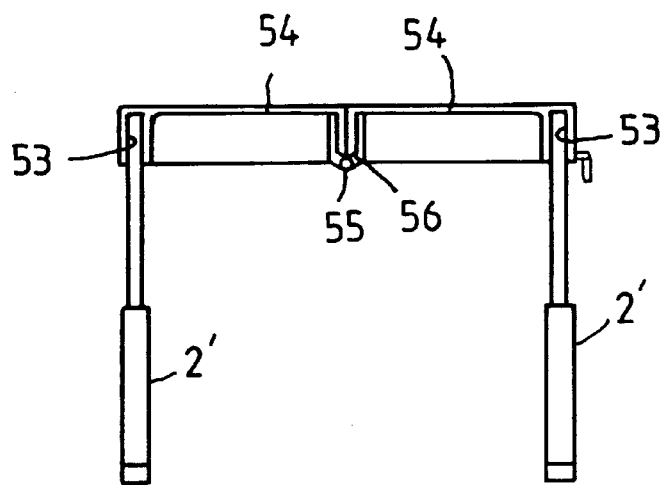
FIG. 14 is a sectional view taken along line 14—14 of FIG. 13.
Figure 15:
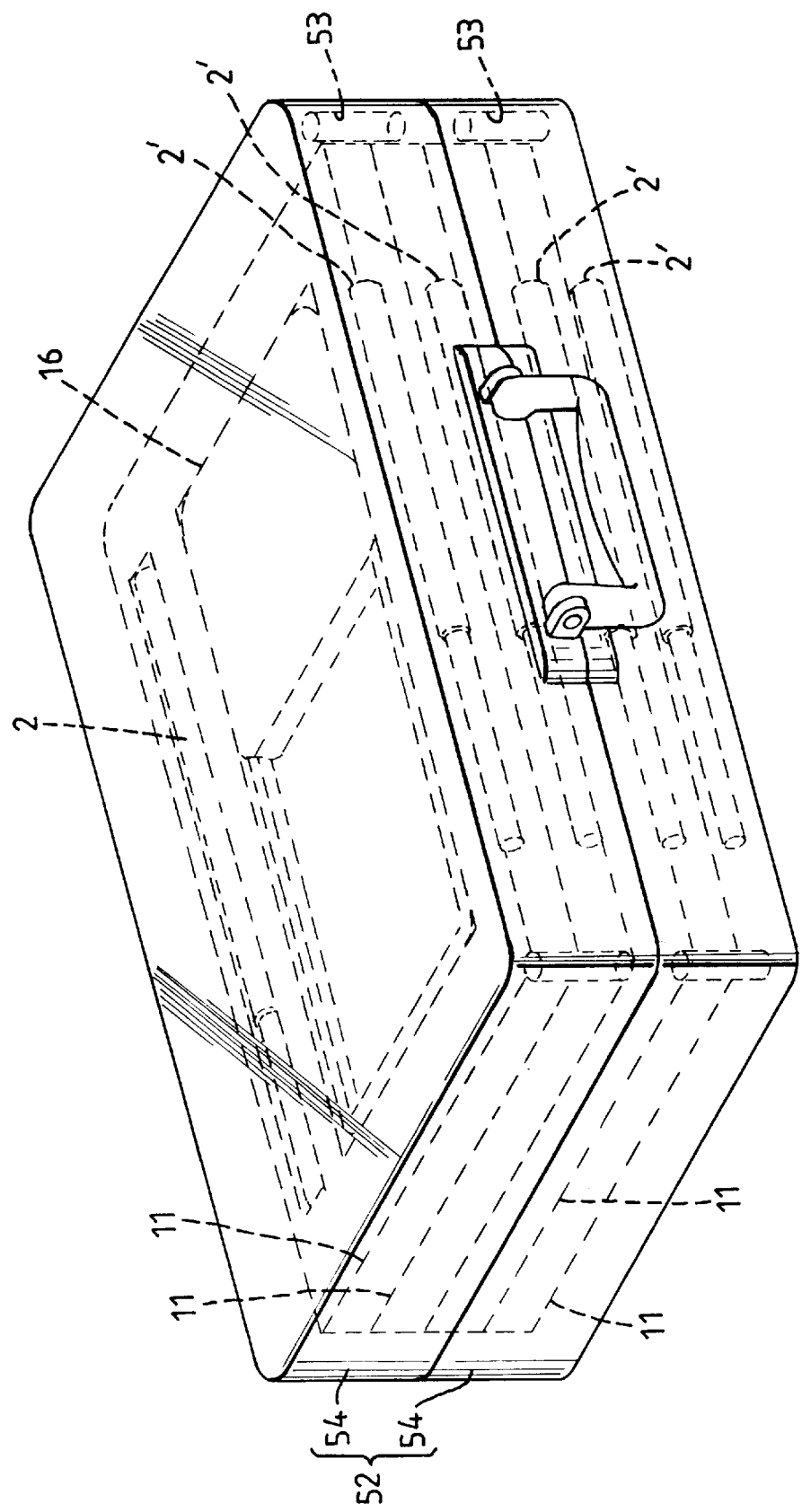
FIG. 15 is a perspective view of the suitcase for containing the components of the present invention.

Referring to FIGS. 13 to 15, the present invention further includes a suitcase 52 and several table legs 2'. The aforesaid table board members 11 and table legs 2 can be received in the suitcase 52. The suitcase 52 is composed of two casings 54 pivotally connected with each other by a hinge 55 at an adjoining side 56. The two casings 54 can be stretched open with outer faces facing upward to form another table face. Each corner of inner side of the suitcase 52 is disposed with a connecting socket 53 for inserting the table leg 2' therein to form another table.

According to the above arrangement, the present invention has simple structure and less components. The present invention is manufactured at low cost and can be easily quickly assembled without any tool. All the components are contained in the suitcase for easy carriage. The length of the table legs can be respectively adjusted in accordance with the tophgraphy of the ground to make the table face horizontal and position the table face at a desired height. The suitcase can be stretched open to form another table. The insertion member of the table face can be removed from the central receptacle of the table face and an oven can be placed rested in the central receptacle for cooking. The knockdown table is designed with a square pattern and chairs can be placed around the table.

It should be understood that the above description and drawings are only used for illustrating some embodiments of the present invention, not intended to limit the scope thereof. Any variation and derivation from the above description and drawings should be included in the scope of the present invention.

What is claimed is:

1. A knockdown table/chair assembly comprising:

four table board members, each table board member including (a) a first lateral edge, (b) a second lateral edge intersecting said first lateral edge at a corner of said table board member, said second lateral edge having a longitudinally tapered groove formed therein and extending from said corner, said groove having a pair of latch channels respectively formed in opposing longitudinal edges thereof, (c) a longitudinally extended latching member coupled to said first lateral edge for sliding engagement with a respective groove of another of said table board members, said latching member having a first latch portion coupled to said first lateral edge and a pair of second latch portions respectively extending from said first latch portion at each of two opposing longitudinal edges of said first latch portion, said pair of second latch portions being respectively slidably engaged within said pair of latch channels of said other table board member and being angularly disposed to define a tapered contour of said latching member for releasable locking engagement with said other table board member, (d) a connecting socket formed in a bottom side of said table board member, and (e) a retainer extending from said first lateral edge, said four table board members being releasably locking engaged together to form a table face having a centrally disposed receptacle opening, said retainer of each said table board member being disposed within said receptacle opening;

an insertion member removably inserted into said receptacle opening and supported by said retainers, said insertion member having an upper surface disposed in substantially flush relationship with adjacent upper surfaces of said four table board members; and, four table legs respectively inserted in said connecting sockets.

2. The knockdown table/chair assembly as recited in claim 1 where said insertion member has a centrally disposed hole formed therethrough for receiving an umbrella post therein.

3. The knockdown table/chair assembly as recited in claim 1 where each of said four table legs includes at least two leg members telescopically coupled one to the other for adjusting a height of said table face.

4. The knockdown table/chair assembly as recited in claim 1 where each of said four table board members has a first recess a second recess formed in said bottom side thereof, said first recess being dimensioned and contoured for receiving a folding chair therein, said second recess being dimensioned and contoured for receiving a respective one of said four table legs therein.

5. A knockdown table/chair assembly comprising:

four table board members, each table board member having an L-shaped contour and including (a) a first lateral edge, (b) a second lateral edge adjacent said first lateral edge and extending orthogonal thereto, said second lateral edge having a longitudinally tapered groove formed therein, said groove having a pair of latch channels respectively formed in opposing longitudinal edges thereof, (c) a longitudinally extended latching member coupled to said first lateral edge for sliding engagement with a respective groove of another of said table board members, said latching member having a first latch portion coupled to said first lateral edge and a pair of second latch portions respectively extending from said first latch portion at each of two opposing longitudinal edges of said first latch portion, said pair of second latch portions being respectively slidably engaged within said pair of latch channels of said other table board member and being angularly disposed to define a tapered contour of said latching member for releasable locking engagement with said other table board member, (d) a connecting socket formed in a bottom side of said table board member, and (e) a retainer extending from said first lateral edge, said four table board members being releasably locking engaged together to form a table face having a centrally disposed receptacle opening, said retainer of each said table board m ember being disposed within said receptacle opening;

an insertion member inserted into said receptacle opening and supported by said retainers, said insertion member having an upper surface disposed in substantially flush relationship with adjacent upper surfaces of said four table board members; and, four table legs respectively inserted in said connecting sockets.

6. The knockdown table/chair assembly as recited in claim 5 where each of said four table legs includes at least two leg members telescopically coupled one to the other for adjusting a height of said table face.

* * * * *